US005450936A

United States Patent [19]

Andonov et al.

[11] Patent Number: 5,450,936

[45] Date of Patent: Sep. 19, 1995

[54] DEVICE FOR DISTRIBUTING POWDERY MATERIALS

[75] Inventors: Radomir Andonov, Mamer; Emile Lonardi, Bascharage, both of Luxembourg

[73] Assignee: Paul Wurth S.A., Luxembourg

[21] Appl. No.: 121,596

[22] Filed: Sep. 15, 1993

[30] Foreign Application Priority Data

Sep. 16, 1992 [LU] Luxembourg ........................... 88172

[51] Int. Cl.[6] ............................................... B65G 11/12

[52] U.S. Cl. ........................................... 193/3; 34/576; 193/16

[58] Field of Search ................. 34/576, 577, 580, 582, 34/592, 359, 375; 193/3, 16, 23; 198/535

[56] References Cited

U.S. PATENT DOCUMENTS 5,252,063 10/1993 Thillen et al. ....................... 432/235

*Primary Examiner*—Henry A. Bennet

*Attorney, Agent, or Firm*—Fishman, Dionne & Cantor

[57] ABSTRACT

A device for distributing powdery materials comprises a suspension sleeve which extends a rotary cage axially upwards through a plate. A running ring is fixed using a first collar to a suspension sleeve and using a second collar to an annular flange supported by the support structure above the horizontal plate. A ring forms part of the supply channel and is coaxial with the suspension sleeve. Leaktightness is ensured by a first leaktight seal between the suspension sleeve and this ring, and by a second leaktight seal between the suspension sleeve and the horizontal plate.

10 Claims, 2 Drawing Sheets

DEVICE FOR DISTRIBUTING POWDERY MATERIALS

TECHNICAL FIELD

The present invention relates to a device for distributing powdery materials over a surface. More particularly, the present invention relates to a device for distributing powdery materials over a surface in an enclosed space where there is an atmosphere at high temperature and loaded with dust. The device comprises a support structure installed on the enclosed space above the surface and fitted with a plate, a fixed supply channel for the powdery materials, mounted above the plate and communicating through an opening in the latter with the enclosed space, a rotary cage arranged below the opening, a chute with an adjustable angle of inclination suspended from the rotary cage, and means for driving the cage.

Although not being limited thereto, the present invention more particularly relates to the application of such a device to the uniform distribution of lignite powder in a fluidized-bed lignite drier. For this application, the design of the rotary suspension device of the chute is subject to quite specific constructional constraints. First, penetration of oil or any other lubricant into the enclosed space of the drier must at all costs be avoided. Next, there must be no risk of the suspension means of the rotary cage seizing up under the action of fine lignite powder particles. Finally, thermal constraints must be taken into account, and more especially problems of differential expansion due to the temperature gradients to which the various members of the suspension means of the rotary cage are subjected. Thus, provision must be made for the temperature inside the enclosed space to rise to approximately 150° C., while the temperature of the support structure outside the enclosed space may fall, in winter in certain regions, substantially below 0° C.

BACKGROUND OF THE INVENTION

A prior art device for uniform distribution of lignite powder in a fluidized-ed lignite drier, is described in Luxembourg Patent LU-87 922 and corresponding U.S. patent application Ser. No. 870,626, now U.S. Pat. No. 5,273,148, the entire contents of which are incorporated herein by reference. In accordance with the device of Luxembourg Patent LU-87 922 a rotary cage supporting a chute with a variable angle of inclination is suspended from a peripheral annular ring of vertical axis. The peripheral edge of this ring is supported vertically and guided radially by wheels spaced circumferentially by an angle of 120° C. on the support structure of the cage. This solution completely satisfies the above mentioned constructional constraints. The rolling surfaces of the wheels and the corresponding surfaces of the ring on which the wheels bear are, however, subjected to dry metal to metal contact and because of this undergo some degree of wear. The supporting and guiding wheels, as well as the peripheral annular ring, should therefore be considered as wear components which should be expected to be replaced regularly. This replacement naturally gives rise to labor and material costs and requires shutdowns of the installation.

SUMMARY OF THE INVENTION

An object of the present invention is to provide a device for uniform distribution of powdery materials, which no longer comprises wear components at the suspension of the rotary cage. In accordance with which, the present invention comprises; a suspension sleeve which extends the rotary cage axially upwards through the opening in the plate, a running ring with a first collar fixed to the suspension sleeve and a second collar fixed to an annular flange supported by the support structure above the plate, a ring forming part of the supply channel and coaxial with the suspension sleeve, a first leaktight seal between the suspension sleeve and this ring and a second leaktight seal between the suspension sleeve and the horizontal plate.

It will be appreciated that the present invention disproves the technical assumption that there is no simple solution for suspending the rotary cage using a lubricated rolling device while satisfying all the above mentioned constructional constraints.

In the device of the present invention, the suspension of the cage is effectively separated by ingenious design and location of the suspension members and of the leaktight seals from the dusty atmosphere existing, on the one hand, in the enclosed space above the surface on which the powdery materials are distributed and, on the other hand, in the supply channel of the chute. Excessive deposition of dust on the suspension members of the cage is therefore no longer to be feared.

The plate situated below the suspension of the cage avoids, by interacting with the second leaktight seal, any risk of penetration of lubricant into this enclosed space. There is consequently, from the point of view of lubrication, no further objection to using, as the suspension means, a running ring which is known in the art. The latter makes it possible to avoid dry rolling suspension types which are known in the state of the art.

The device of the present invention is therefore distinguished by a simple suspension system for the cage, without wear pieces proper. It makes it possible, by virtue of its ingenious design, to employ lubricated rolling surfaces, without thereby risking seizing up by deposition of powdery materials on the latter and without having to fear penetration of lubricants into the enclosed space below the device.

It will be appreciated that the clearance between the inner collar and the collar of the running ring should be determined taking into account in particular the temperature difference between the outer collar and the inner collar. In other words, provision should be made for the inner collar to be able to expand radially to a greater extent than the outer collar. The latter is in fact in direct contact with the cold parts of the device, more precisely with the annular flange supported by the support structure which is in direct contact with the suspension sleeve which, heated by the high-temperature atmosphere inside the enclosed space, is markedly hotter than the annular flange.

It will further be appreciated that this radial clearance of the running ring is not constant. During the startup phase, when the running temperature in the enclosed space below the powdery material distribution device is not yet reached, this radial clearance has its maximum value. It then decreases to reach its minimum value, when the suspension sleeve reaches its running temperature. It will also be appreciated that, in a hot environment, the temperature difference between the outer collar and the inner collar is less, and the radial clearance is necessarily higher than in a cold environment.

A preferred embodiment of the device of the present invention makes it possible to overcome these disadvantages. In this preferred embodiment, the annular flange to which the outer collar of the running ring is fixed, is fitted with a heating circuit. Heating this flange makes it possible to substantially reduce the temperature difference between the two collars. The result of this is that the radial clearance of the running ring need no longer be over dimensioned because it is substantially constant for all the operating regimes of the device. Furthermore, this radial clearance now depends very little on the climatic environment in which the device is installed. There results a longer lifetime of the running ring and better operation of the device, especially in a climatic environment characterized by large temperature changes and/or when the device needs to be started and stopped frequently. The person skilled in the art will consequently realize that this preferred embodiment of the device provided makes it possible simply and efficiently to solve all the problems of differential expansion due to the temperature gradients to which the running ring is subjected.

It will be appreciated that the plate and the suspension sleeve advantageously define, at the opening in the plate, more precisely below the second leaktight seal between the plate and the sleeve, an annular space. A pressurized gaseous fluid is then injected into this annular space, so as effectively to protect the second leaktight seal against direct contact with the dusty atmosphere below the horizontal plate.

The running ring is advantageously integrated in a cavity delimited upwards by a radial lip, which is integral with the suspension sleeve and which overlaps the inner and outer collars of the running ring, and delimited downwards by a labyrinth seal between the flange and suspension sleeve. This chamber constitutes additional protection against penetration of powdery materials into the running ting.

The radial lip is moreover advantageously delimited radially by a rim pointing downwards which interacts with a corresponding boss on the annular flange in order to form a vertical circumferential air seal below the lip. This vertical air seal effectively prevents penetration of powdery materials below the radial lip.

In a preferred embodiment, the suspension sleeve supports a funnel which extends into the rotary cage towards the chute. In this manner, the suspension sleeve and the seals are effectively protected against direct contact with powdery materials and are not subjected to wear by erosion.

It has moreover been found advantageous to provide the chute, this funnel as well as a second funnel, mounted in the supply channel, with heating circuits. Heating these surfaces prevents them becoming wet, thus preventing powdery materials adhering to these surfaces. The heating systems of the two funnels and of the chute moreover advantageously make use of a thermal fluid common to the heating system of the flange.

In a preferred embodiment of the device of the present invention, the chute is statically and dynamically balanced by a counterweight. In this manner, the stressing of the running ring is more uniform and essentially axial, which has a favorable influence on its lifetime.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
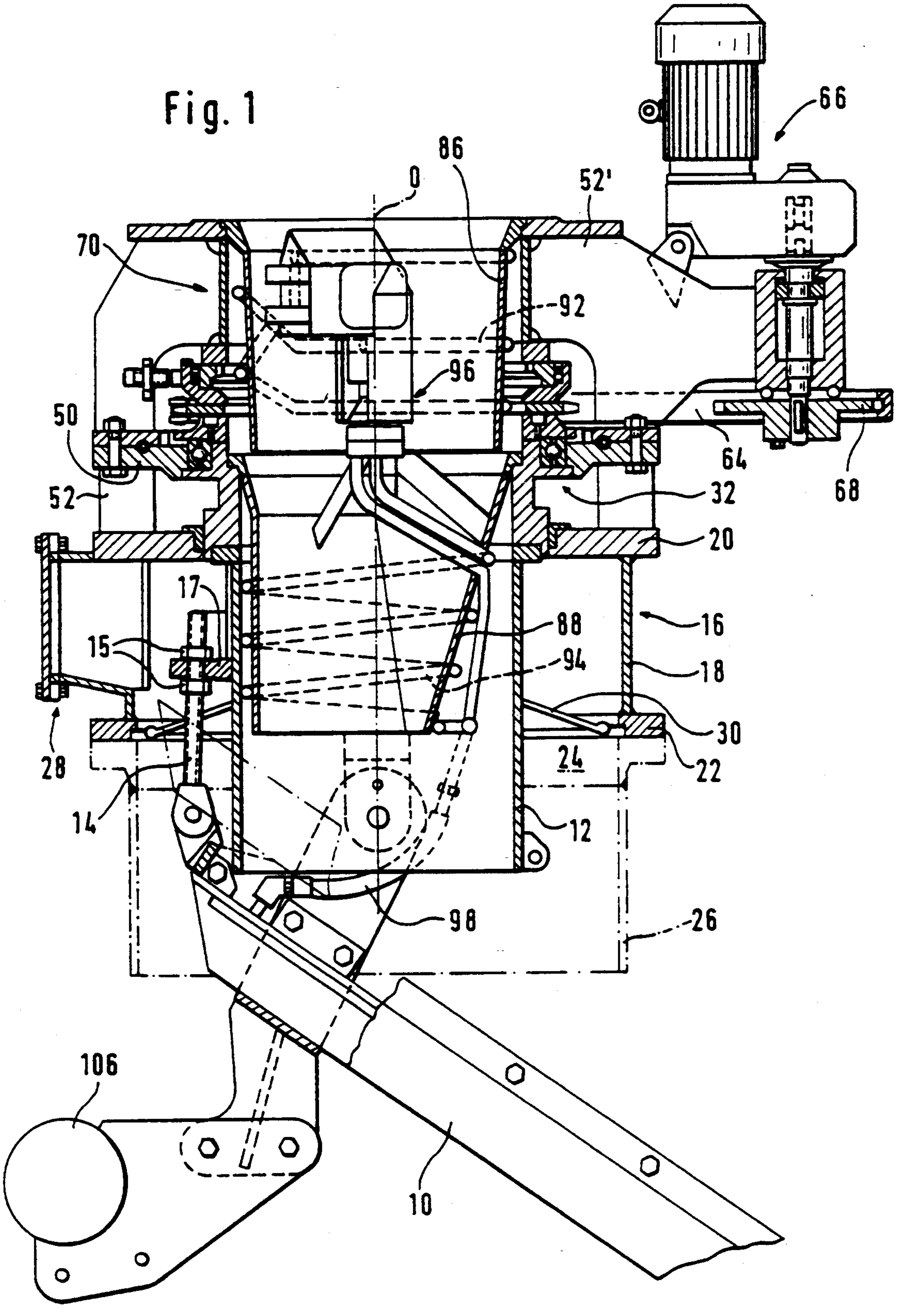
FIG. 1 shows, in a section on a vertical plane, a diagrammatic view of a distribution device according to the present invention.

Referring to FIG. 1, a device for uniformly distributing powdery material over a surface is shown. It is more precisely a device used for distributing lignite powder in a fluidized-bed lignite drier. The device might however also be used advantageously in any other application which involves uniform distribution of powdery materials in an enclosed space where there is a high temperature atmosphere and which is, furthermore, loaded with dust, while avoiding contact of the powdery materials with a lubricant.

The device provided is fitted with a distribution chute which, in order to assure uniform distribution, advantageously has a shape as described in the specification of European Patent EP-A-O, 343,466 and corresponding U.S. Pat. No. 5,273,148 the entire contents of which are incorporated herein by reference. The chute consequently comprises a planar and elongate sliding surface, with one longitudinal side which is straight and fitted with a lateral retention border. The opposite longitudinal side then constitutes the pouring side. It advantageously has the shape of an elongate S whose curvature extends uninterruptedly to the lower comer of the straight side.

This chute 10 is suspended from a rotary cage 12 so as to be able to pivot about a horizontal axis. The angle of inclination of the chute 10 about the horizontal axis can be adjusted using a rod 14 which is articulated on the upper end of the chute 10. The inclination of the chute is adjusted for example manually, using nuts 15 which make it possible to position the rod 14 in a guide 17 fixed onto the outer wall of the rotary cage 12. It will also be appreciated that the device might also be fitted with two diametrically opposite chutes suspended from the same rotary cage 12.

The whole is integrated in a support structure which is given the overall reference 16 and which is installed above the surface onto which the powdery materials are to be distributed. This support structure comprises a casing 18 which ends at the top in a horizontal plate 20 and at the bottom in a flange 22. Using this flange 22, the casing 18 can be fixed in a leaktight manner above an opening 24 made in an enclosed space 26, above the lignite drier (not shown). The casing 18 is, of course, provided with one or more inspection accesses 28, for example to make it possible to adjust the inclination of the chute 10. A sheet metal shell 30 is fixed to the rotary cage 12 and extends radially to near the flange 22. This shell 30 forms a screen at the opening 24 and thus prevents, as much as is possible, excessive penetration of powdery materials into the casing 18. It will be appreciated that the casing 18 can also be held in over pressure with respect to the enclosed space 26 by a ventilation system supplying clean air, a gas or vapor into the casing 18. This means naturally improves the efficiency of the shell 30.

In order to allow the chute 10 to be rotated, the cage 12 is mounted on the support structure 16 so as to be able to turn about a vertical axis. For this purpose, the cage 12 is extended upwards through the plate 20 by a suspension sleeve 32. At the plate 20, this suspension sleeve 32 is fitted with an outer cylindrical surface 33 which is fitted into an axially symmetric opening 34 in the plate 20. This opening 34 is provided with a circumferential cut 36 on its upper edge. In this cut 36 an annular seal 38 is arranged, preferably a lip joint which bears radially on the outer cylindrical surface 33 of the suspension sleeve 32. Below the annular seal 38, the plate 20 and the sleeve 32 delimit an annular space 37. Clean air, a gas or vapor is advantageously injected into this annular space 37 so as to prevent direct contact between the annular seal 38 and the dusty materials. This procedure has a highly favorable influence on the lifetime of this annular seal 38.

Above the plate 20, the suspension sleeve 32 is fitted with a running ring given the overall reference 40. This running ring 40, which is known in the art, comprises an inner collar 42, rolling elements, for example balls, and an outer collar 44. These elements are dimensioned above all so as to take up strong axial forces.

The inner collar 42 is integrally attached, for example using screws 46, to the suspension sleeve 32. The outer collar 44 is, for its part, integrally attached, for example using screws 48, to an annular flange 50.

This annular flange 50 is supported by vertical cross pieces 52 integral with the support structure 16, for example welded onto the plate 20. It will be noted that, below the running ring 40, the flange 50 forms, with a cylindrical surface of the suspension sleeve 32, a labyrinth seal 53. This labyrinth seal 53 is advantageously covered on the bottom by a hoop 54 which is for example screwed onto the flange 50 and which forms a circumferential air seal with a corresponding rim of the suspension sleeve 32 which extends parallel to the hoop 54. This assembly effectively prevents substantial loss of lubricant from the running ring 40 downwards.

Above the running ring 40, the suspension sleeve 32 advantageously forms a lip 56 which extends radially above the first and the second collars 42 and 44 in order further to protect the running ring 40 against deposition of powdery materials. It will be appreciated that the lip 56 is delimited radially by a rim pointing downwards which interacts with a boss 60 on the flange 50 in order to create a circumferential air seal extending vertically under the lip 56. This vertical seal constitutes an effective barrier against penetration of powdery materials below the lip 56.

Above the lip 56, the suspension sleeve 32 supports a toothed ring 62 in which the links of an endless chain 64 mesh. This endless chain 64 is driven by a motor 66 via a toothed wheel 68 (FIG. 1). The motor 66 is fixed onto a vertical crosspiece 52′ of the support structure 16.

Above the suspension sleeve 32, a fixed supply channel 70 is arranged, which is supported by vertical crosspieces 52, 52′ of the support structure 16. At its lower end, the supply channel 70 is provided with an outer cylindrical surface 76. This outer cylindrical surface 76 forms part of a ring 74, which is screwed onto a flange 72 of the supply channel 70 and which fits into the upper end of the suspension sleeve 32. In this upper end of the suspension sleeve 32, more precisely at the cylindrical surface 76, an annular seal 78 is arranged, preferably a lip joint, which bears radially on the cylindrical surface 76 of the ring 74. The inside of the supply channel 70 is thereby isolated from the space outside the suspension sleeve 32 where the suspension and drive means for the rotary cage 12 are situated, these means being to some degree sensitive to the dusty atmosphere existing inside the supply channel.

It has been determined that, in order to reduce the radial clearance of the running ring, it is advantageous to heat the annular flange 50. For this purpose, a pipe 80 for circulating a thermal fluid is placed in a circumferential groove 82 of the flange 50. This pipe 80 is then covered with a backing flange 84 fixed by screws 85 onto the flange 50 so as to ensure close contact of the pipe 80 with the flange 50. The temperature and the flow rate of the thermal fluid are chosen so as to heat the flange 50 to a temperature substantially equal to the temperature of the suspension sleeve 32. In this manner, the inner collar 42 and the outer collar 44 of the running ring 40 are no longer subjected to a significant temperature difference. The result of this is that the radial clearance of the running ring 40 need no longer be over dimensioned in order to take up a differential expansion of the two collars. It should also be noted that the flange 50 might also be heated using an electrical heating cable.

The supply channel 70 is advantageously fitted with an inner funnel 86 which extends from the upper end of the channel 70, in the axial direction of the latter, into the suspension sleeve 32, where it emerges in a funnel 88. The latter is integral with the suspension sleeve 32 and extends in the axial direction into the rotary cage 12, where it ends above the upper end of the chute 10. These two funnels 86 and 88 should be considered as wear pieces and are, because of this, designed to be dismounted easily. Thus, the funnel 88 is for example fitted with a rim 90 which is fixed by screws 91 onto a rim machined in the suspension sleeve 32. The funnel 86 may be fixed in a similar manner into the supply channel 70.

The two funnels 86 and 88 are advantageously surrounded by heating circuits 92, 94, represented by broken lines in FIG. 1. These heating circuits 92, 94 for example consist of a coiled tube fixed onto the outer wall of the funnels 86 and 88. The reference 96 represents a rotating joint which axially supplies the coil 94 of the funnel 88 integral with the rotary cage 12. The chute 10 is also advantageously fitted with a circuit for heating the slide ramp. The heating circuit is then connected by hoses 98 in parallel or in series onto the coil 94. It will be recalled that the object of heating the funnels 86 and 88 and the sliding ramp is to prevent adherence of wet powdery materials onto these surfaces. It will also be appreciated that the flange 50, the funnels 86 and 88 and the chute 10 can be heated using the same thermal fluid.

Figure 2:
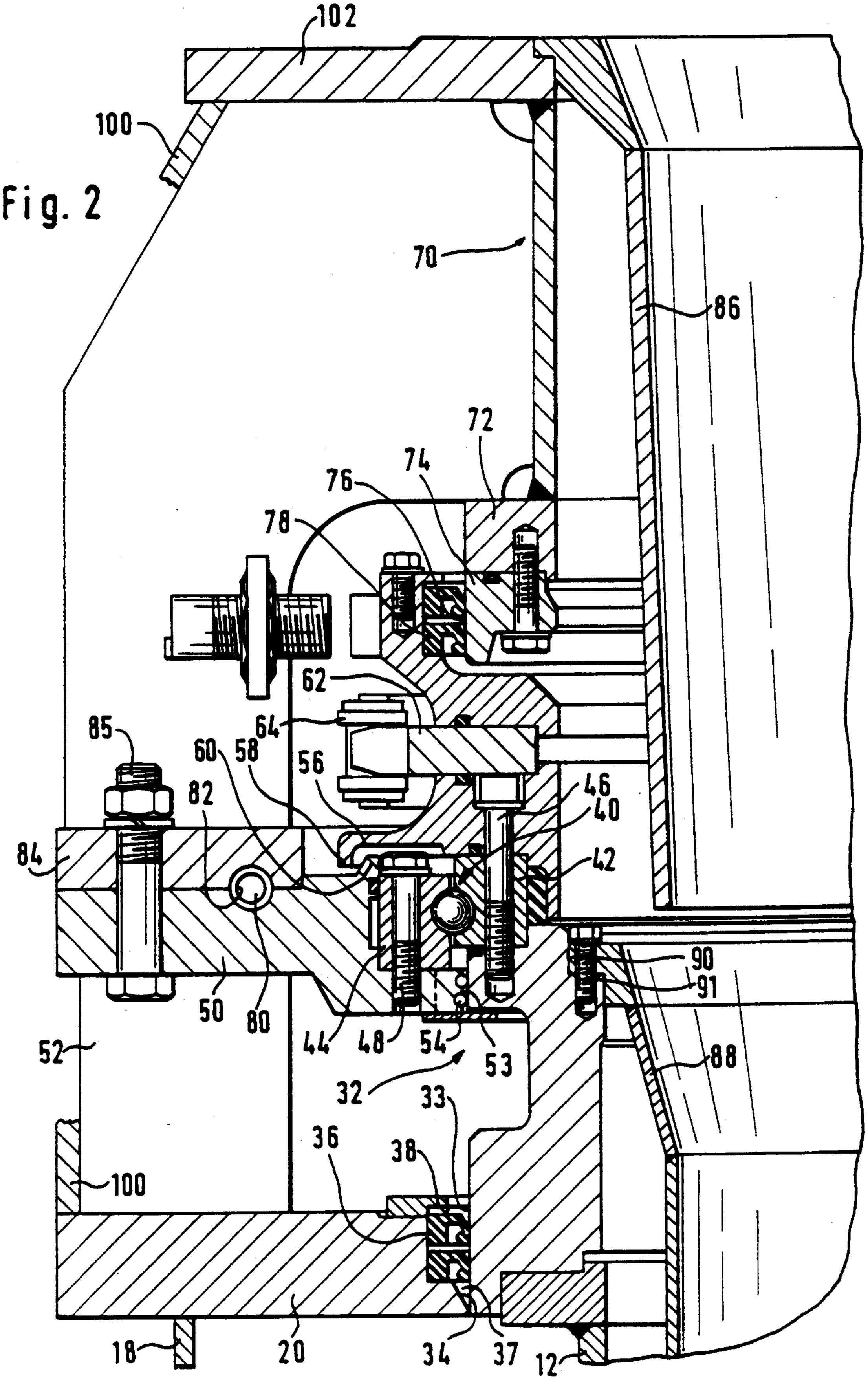
FIG. 2 shows, in a section on a vertical plane, a detail of the suspension of a rotary cage from which is suspended a distribution chute with variable angle of inclination.

In FIG. 2, the reference 100 denotes a segmented and removable wall which is, for example, screwed onto the vertical crosspieces 52. This wall 100 defines a closed annular chamber around the supply channel 70 and the suspension sleeve 32. At the top, this chamber is bounded by a second plate 102. In this manner, the suspension of the rotary cage 12 is well shielded from any bad weather and is even more protected against any deposition of powdery materials.

In FIG. 1, it is seen that the chute 10 is fitted with a counterweight 106. This counterweight 106 is preferably dimensioned so that the center of gravity of the chute/counterweight combination is situated on the axis of rotation of the suspension sleeve 32. In this manner, the suspension sleeve 32 is not subjected to a tilting moment of static origin. Furthermore, the position of the counterweight 106 is also chosen so that the centrifugal forces due to the counterweight 106 on one side and to the chute 10 on the other side of the axis of rotation cancel each other out. In this manner, the suspension sleeve 32 is no longer under a tilting couple due to dynamic forces.

This static and dynamic balancing of the chute 10 naturally has a very positive influence on the lifetime of the running ring 40.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A device for distributing powdery materials over a surface, comprising:

a support structure disposed on an enclosed space above the surface;

a plate having an opening therethrough, said support structure being fitted with said plate;

a fixed supply channel receptive to the powdery materials, said fixed supply channel mounted above said plate and communicating through said opening in said plate with said enclosed space;

a rotary cage disposed below said opening;

a chute having an adjustable angle of inclination, said chute suspended from said rotary cage;

means for driving said rotary cage;

a suspension sleeve which extends said rotary cage axially upwards through said opening in said plate;

an annular flange supported by said support structure above said plate;

a running ring having a first collar fixed to said suspension sleeve and a second collar fixed to said annular flange;

a ring forming part of said supply channel and coaxial with said suspension sleeve;

a first leaktight seal disposed between said suspension sleeve and said ring; and a second leaktight seal disposed between said suspension sleeve and said plate.

2. The device of claim 1 further comprising:

a heating circuit fitted to said annular flange to which said second collar of said running ring is fixed.

3. The device of claim 1 wherein said plate and said suspension sleeve interact to delimit, below said second leaktight seal, an annular space, said annular space being adapted for connection to a pressurized gaseous fluid distribution circuit.

4. The device of claim 1 further comprising:

a labyrinth seal disposed between said annular flange and said suspension sleeve; and wherein said running ring is integrated in a cavity delimited upwards by a radial lip integral with said suspension sleeve and overlapping said first and second collars, and delimited downwards by said labyrinth seal.

5. The device of claim 4 further comprising:

a downward pointing rim delimitating radially said radial lip; and a boss on said annular flange corresponding to said rim, said rim interacts with said corresponding boss on said annular flange to form a vertical circumferential air seal below said radial lip.

6. The device of claim 1 further comprising:

a closed chamber delimited downwards by said plate, upwards by a second plate surrounding said supply channel, laterally outward by a removable wall, and laterally inward by said suspension sleeve and by said supply channel, said annular flange having said second collar of said running ring fixed thereto being disposed in said closed chamber.

7. The device of claim 1 further comprising:

a first funnel extending into said rotary cage towards said chute, said first funnel being supported by said suspension sleeve.

8. The device of claim 7 further comprising:

a second funnel extending into said supply channel; and heating circuits fitted to said first funnel, said second funnel and said chute.

9. The device of claim 1 further comprising:

a counterweight for statically and dynamically balancing said chute.

10. The device of claim 1 wherein said means for driving said rotary cage comprises:

a toothed ring integral with said suspension sleeve and mounted above said plate;

an endless chain; and a motor for driving said endless chain.

* * * * *